(No Model.) 2 Sheets—Sheet 2.

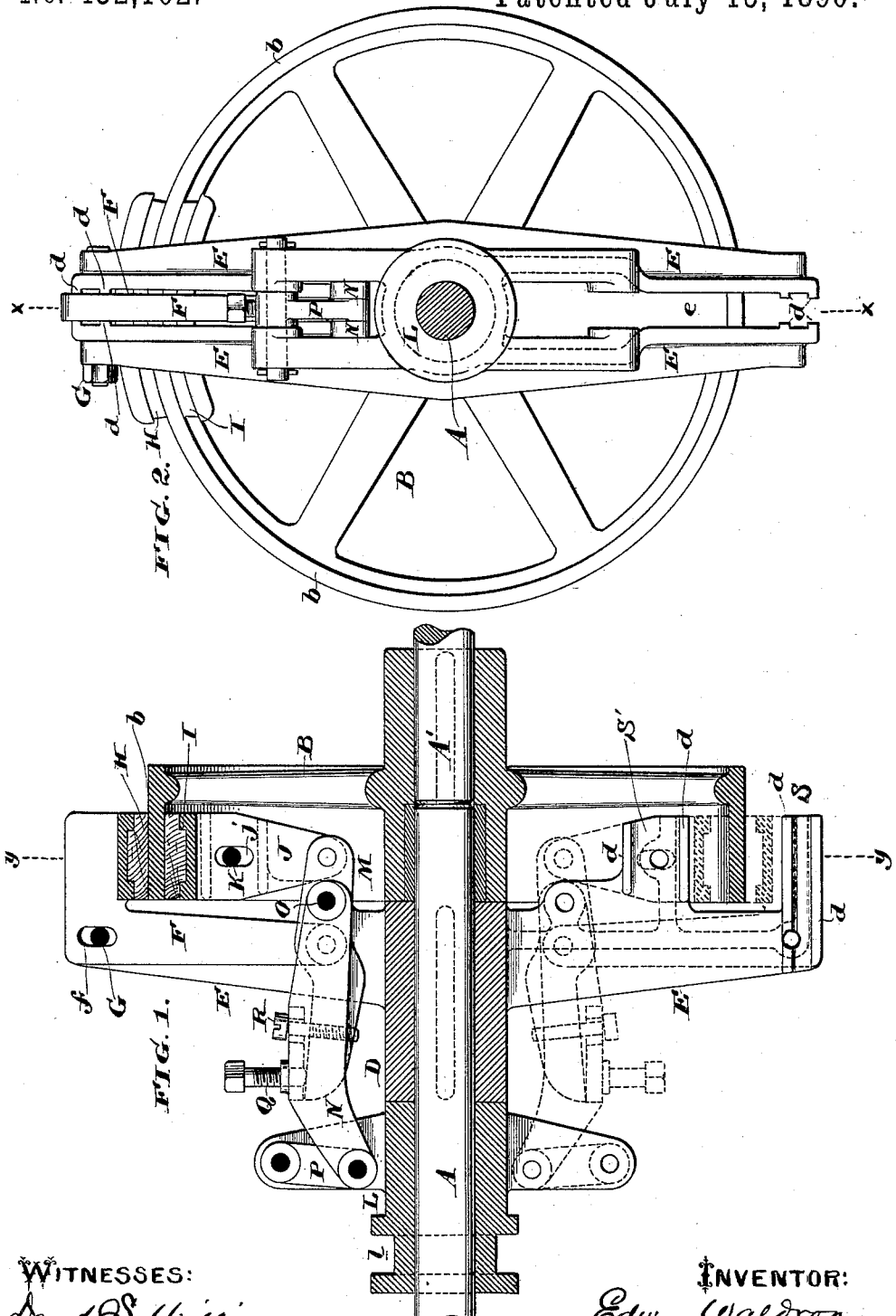

E. WALDRON.
PULLEY CLUTCH.

No. 432,102. Patented July 15, 1890.

WITNESSES: INVENTOR:
David S. Williams Edward Waldron
Henry By his atty

THE NORRIS PETERS CO., PHOTO-LITHO., WASHINGTON, D. C.

UNITED STATES PATENT OFFICE.

EDWARD WALDRON, OF PHILADELPHIA, PENNSYLVANIA.

PULLEY-CLUTCH.

SPECIFICATION forming part of Letters Patent No. 432,102, dated July 15, 1890.

Application filed October 2, 1889. Serial No. 325,799. (No model.)

*To all whom it may concern:*

Be it known that I, EDWARD WALDRON, of the city and county of Philadelphia, and State of Pennsylvania, have invented an Improvement in Pulley-Clutches, of which the following is a specification.

My invention has reference to pulley-clutches; and it consists of certain improvements which are fully set forth in the following specification and shown in the accompanying drawings, which form a part thereof.

The object of my invention is to provide a simple and yet positive clutch device for connecting and disconnecting two shafts or other parts for the purpose of transmission of power, and so that the shafts or other parts may be connected or disconnected while running. In place of connecting two shafts one shaft may support a pulley and be connected or disconnected with respect to said pulley.

In carrying out my invention I provide a friction-pulley upon one shaft and a clutch-carrying device upon the other shaft, the said parts being respectively connected and rotating with their respective shafts, or I may have the clutch-carrying device and a loose pulley on the one shaft.

The clutch mechanism, when intended to connect two shafts, consists, essentially, of a hub secured to one shaft and provided with pairs of arms or ribs, each pair of which is furnished with pairs of projections which extend above and below the flange of a pulley secured upon the other shaft, and connected to which arms and their projections and working between them are movable jaws adapted to grasp the said flange of the pulley. These jaws are operated by a pivoted lever, which in turn is actuated by means of a toggle arrangement connected with a sliding sleeve which may be operated in any of the well-known manners longitudinally upon the shaft. Adjusting devices are employed between the two levers, whereby a given movement of the sleeve may operate the jaws to grasp or release the flange of the wheel in a predetermined manner. The same mechanism may be used to connect and disconnect a loose pulley on the one shaft.

Figure 3:
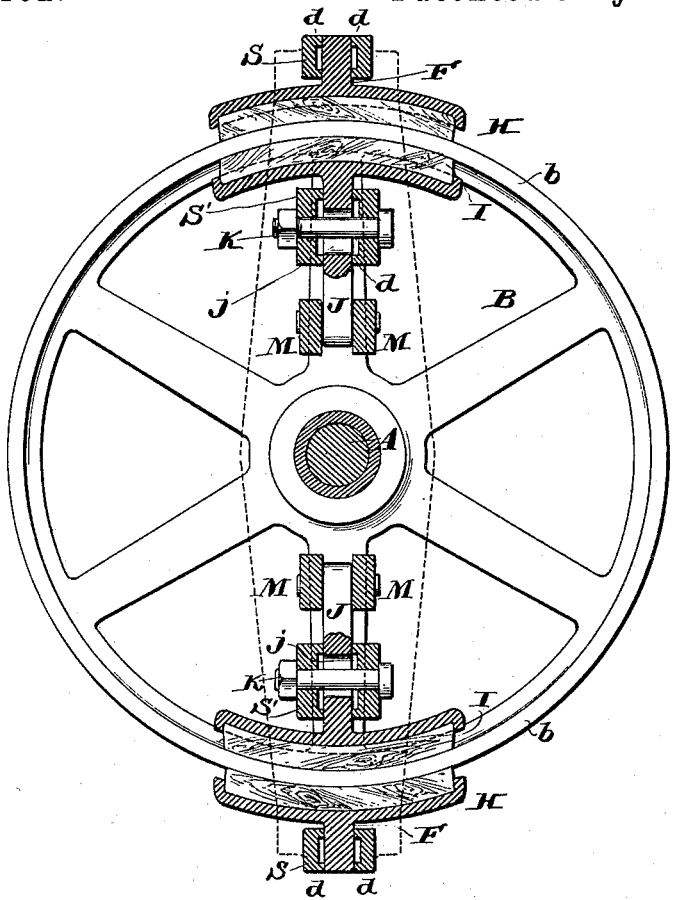
Figure 4:
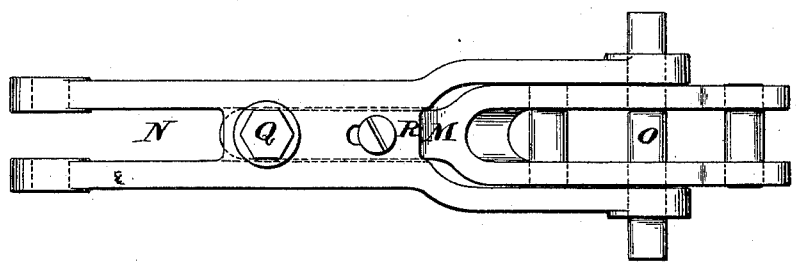

In the drawings, Figure 1 is a sectional elevation, on line $x$ $x$ of Fig. 2, of the pulley-clutch embodying my invention. Fig. 2 is an end view of the same. Fig. 3 is a sectional view on line $y$ $y$ of Fig. 1, and Fig. 4 is a plan view of the actuating-lever mechanism.

A is one shaft and A' is the other. Upon the shaft A' is secured a pulley B, which is provided with an overhanging rim $b$. Upon the other shaft A is secured a hub D, preferably keyed to the shaft. The hub is provided with a frame having two or more pairs of arms or ribs E, each pair of which consists of two parallel parts E E, preferably alike and with an opening or space $e$ between them, and which it is desirable shall extend all of the way through from the hub, and said opening or space is in the same plane or parallel with the shaft. The arms E are provided at their outer ends with projections S S', which extend over the exterior and interior surfaces of the rim $b$ of the pulley B. This construction makes the ribs or arms E to extend beyond the inner and outer surfaces of the pulley-rim B, and thereby form a positive support for the pivoting and guiding of the outer and inner clamping-shoes. Arranged between the arms or ribs, and respectively between the projections S and S', are frames F and J, to which are respectively secured clamping-shoes H and I, located upon each side of the rim of the pulley. These frames F and J are guided laterally against the projections $d$, which enable fitting to be easily performed, and also prevent excessive friction to the moving of the parts when it is desirable that they shall be moved. The frame F is preferably bell-crank shaped, and is provided with a slot $f$, arranged radially with respect to the shaft A, and through this slot $f$ and the sides of the arms or ribs E E is arranged a pin or bolt G, which acts as a guide for the radial movement of the said frame F. The inner frame J is likewise provided with a radial slot $j$, through which a similar pin or bolt K passes, and which acts as a guide for the radial movement of the frame J. This bolt also passes through the sides of the ribs or arms E, and with the bolt G acts to strengthen said ribs and prevent them from being broken by lateral strain. The lower ends of these jaws or frames J and F are pivoted to the lever M on opposite sides of the fulcrum O, which is pivoted to the lever M. As this lever M is rocked upon its fulcrum O the jaws H and I are drawn toward each other to grasp the rim of the pulley, or move apart, and in their movement they are guided by the pins G and K. As the lower ends are pivoted to the lever M, there will be a very slight movement of the said frames F and J about the pins G and K as fulcrums. All of the movements therefore which could occur to the parts F and J are compensated for. Pivoted to the fulcrum O of the lever M is a lever N, which is pivotally connected at $p$ to a link P, which is in turn pivoted at $a$ to the sleeve L, which slides upon the shaft A, and is provided with an annular groove $l$, into which extends the shifting-lever. The parts N and P constitute a form of toggle-joint, so that when the sleeve L is moved away from the pulley the link P swings on the pivot-point $a$, and thus raises the end of the lever N, and when the said sleeve is moved toward the pulley the link P depresses the lever N, exerting an enormous power. The levers M and N are connected by means of the set-screw Q, carried by the lever N, and adapted to press upon the end of the lever M, and the connecting-screw R, which forms a loose connection simply to raise the lever M when releasing the pulley-rim, so that a raising or lowering of the lever N by the link P will correspondingly move the lever M on the fulcrum O. This screw R is secured to the lever M and extends through a hole in the lever N, and is provided with a head, which may be caught in the upward movement of the lever N. It will now be understood that when the sleeve L is moved toward the pulley and the lever N depressed, the set-screw Q presses upon the free end of the lever M, oscillating it upon its fulcrum O, and thereby thrusting the shoe I of the frame J outward against the under surface of the rim of the pulley, and pulling the frame F inward and its shoe H against the outer surface of the pulley, thus gripping the rim of the wheel firmly and causing the two shafts A and A' to be coupled together. Any degree of gripping with a given movement of the sleeve L may be accomplished by simply adjusting the screw Q. To release the pulley, it is simply necessary to move the sleeve L away from the pulley, which action, through the screw R and lever N, oscillates the lever M in the opposite direction, with the effect of pulling the shoes of the frames F and J away from the rim, and thus releasing the pulley. It is evident that while I have only shown two of such pairs of gripping devices arranged diametrically opposite, any number of such parts may be employed, so that in place of gripping the rim in two places in its circumference it may be gripped in any number of places desired.

It is quite apparent that the pulley B may run loosely upon the shaft A', if desired, and act as a driving-pulley by placing a band upon it, as this is a common practice in clutch-pulleys. In such a case the shaft A' may be stationary or might be integral with shaft A.

I do not limit myself to the minor details of construction here shown, as they may be modified in various ways without departing from the spirit of the invention.

I claim—

1. In a pulley-clutch, the combination of a shaft, a pulley having a laterally-projecting rim, a pair of radial arms or ribs secured upon the shaft and having projections extending laterally over both the inner and outer surfaces of the pulley-rim, there being a radial space between said arms or ribs, a pair of movable frames having jaws arranged between the arms or ribs and their projections for grasping the rim of the pulley, guides for said frames to insure their being moved radially, and lever mechanism adjacent to the shaft to simultaneously shift said frames in opposite directions.

2. In a pulley-clutch, the combination of a shaft, a pulley having a laterally-projecting rim, a pair of radial arms or ribs secured upon the shaft and having projections extending laterally over both the inner and outer surfaces of the pulley-rim, there being a radial space between said arms or ribs, a pair of movable frames having jaws arranged between the arms or ribs and their projections for grasping the rim of the pulley, guides for said frames to insure their being moved radially, and lever mechanism adjacent to the shaft to simultaneously shift said frames in opposite directions, consisting of a pivoted lever connected, respectively, upon each side of its fulcrum with the movable frames, a sliding sleeve carried upon the shaft, and connecting mechanism between said sliding sleeve and lever.

3. In a pulley-clutch, the combination of a shaft, a pulley having a laterally-projecting rim, a pair of radial arms or ribs secured upon the shaft and having projections extending laterally upon both the inner and outer surfaces of the pulley-rim, there being a radial space between said arms or ribs, a pair of movable frames having jaws arranged between the arms or ribs and their projections for grasping the rim of the pulley, guides for said frames to insure their being moved radially, and lever mechanism adjacent to the shaft to simultaneously shift said frames in opposite directions, consisting of a pivoted lever having a connection with the respective movable frames upon each side of the fulcrum, a second pivoted lever for operating the first-mentioned lever, a sliding sleeve on the shaft, and a link-connection between the sleeve and last-mentioned or second lever.

4. In a pulley-clutch, the combination of a shaft, a pulley having a laterally-projecting rim, a pair of radial arms or ribs secured upon the shaft and having projections extending laterally upon both the inner and outer surfaces of the pulley-rim, there being a radial space between said arms or ribs, a pair of movable frames having jaws arranged between the arms or ribs and their projections for grasping the rim of the pulley, guides for said frames to insure their being moved radially, and lever mechanism adjacent to the shaft to simultaneously shift said frames in opposite directions, consisting of a pivoted lever having a connection with the respective movable frames upon each side of the fulcrum, a second pivoted lever for operating the first-mentioned lever, an adjustable connection between the two levers, a sliding sleeve on the shaft, and a link-connection between the sleeve and last-mentioned or second lever.

5. In a pulley-clutch, the combination of a shaft, a pulley having a laterally-projecting rim, a pair of radial arms or ribs secured upon the other shaft and having projections extending laterally upon both the inner and outer surfaces of the pulley-rim, there being a radial space between said arms or ribs, a pair of movable frames having jaws arranged between the arms or ribs and their projections for grasping the rim of the pulley, guides for said frames to insure their being moved radially, and lever mechanism adjacent to the shaft to simultaneously shift said frames in opposite directions, consisting of a pivoted lever having a connection with the respective movable frame upon each side of the fulcrum, a second pivoted lever for operating the first-mentioned lever, a set-screw Q, carried by the last-mentioned lever and pressing upon the first-mentioned lever, a sliding sleeve on the shaft, and a link-connection between the sleeve and last-mentioned or second lever.

6. In a pulley-clutch, the combination of a shaft, a pulley having a laterally-projecting rim, a pair of radial arms or ribs secured upon the shaft and having projections extending laterally upon both the inner and outer surfaces of the pulley-rim, there being a radial space between said arms or ribs, a pair of movable frames having jaws arranged between the arms or ribs and their projections for grasping the rim of the pulley, guides for said frames to insure their being moved radially, and lever mechanism adjacent to the shaft to simultaneously shift said frames in opposite directions, consisting of a pivoted lever having a connection with the respective movable frames upon each side of the fulcrum, a second pivoted lever for operating the first-mentioned lever, a set-screw Q, carried by the last-mentioned lever and pressing upon the first-mentioned lever, a lifting-screw R, carried by the first-mentioned lever and acting upon the last-mentioned lever, a sliding sleeve on the shaft, and a link-connection between the sleeve and last-mentioned or second lever.

7. In a pulley-clutch, the combination of a shaft, a pulley having a laterally-projecting rim, a pair of radial arms or ribs secured upon the shaft and having projections extending laterally over both the inner and outer surfaces of the pulley-rim, there being a radial space between said arms or ribs, and provided with lateral wearing and guide projections d, a pair of movable frames having jaws arranged between the arms or ribs and their projections for grasping the rim of the pulley, guides for said frames to insure their being moved radially, extending through the said frames and holding the arms or ribs from spreading, and lever mechanism adjacent to the shaft to simultaneously shift said frames in opposite directions.

8. The combination of a shaft, a pulley having a laterally-projecting rim, a frame secured to the shaft and having a pair of arms or ribs extending away from the shaft and beyond the rim of the pulley, there being a radial space between said arms, two radially-movable clamping-frames arranged in the space between the arms or ribs, guide-bolts extending through said frames and arms or ribs, and a pivoted lever fulcrumed upon the arms or ribs in line with the clamping-frames and connected with them, respectively, upon each side of the fulcrum, a sliding sleeve upon the shaft, and power mechanism between the sleeve and pivoted lever.

9. In a pulley-clutch, the combination of a shaft, a pulley having a laterally-projecting rim, a frame secured to the other shaft, a pair of movable clamping-frames carried thereby and movable in opposite directions to grasp the rim of the pulley, a pivoted lever M, fulcrumed to the frame, a pivoted lever N, fulcrumed also to the frame, a sliding sleeve L, a link connecting the sleeve with the lever N, a lifting-screw R, carried by the lever M and having its head resting upon lever N, to operate said lever M in one direction, and a set-screw Q, carried by the lever N and pressing upon the end of the lever M, to operate said lever in the other direction.

10. In a clutch, the combination of a shaft, a pulley B, having a laterally-projecting rim adapted to rotate concentric with the axis of the shaft, a hub having arms E E, formed with projections S S', secured to the shaft, frames F and J, as shown, having jaws H and I and slots $f$ and $j$, guide-bolts G and K on the arms, and extending, respectively, through the slots $f$ and $j$, lever M, connected to frames F and J, as shown, and fulcrumed at O, and means to move the lever to clamp or release the pulley.

11. In a pulley-clutch, the combination of a shaft having a pair of radial arms extending laterally and separated a distance one from the other, so as to form an intermediate space, a pulley having a laterally-projecting rim, a pair of radially-movable frames for grasping the rim of the pulley arranged between said laterally-extending arms, and lever mechanism to simultaneously shift the frames in opposite directions.

12. In a pulley-clutch, the combination of a pulley having laterally-projecting rim, a shaft having a pair of radial arms extending laterally and separated a distance one from the other, so as to form an intermediate space, and having laterally-projecting portions extending on each side of the rim of the pulley, a pair of movable frames for grasping the rim of the pulley and arranged between said arms and their lateral projections, and lever mechanism to simultaneously shift the frames in opposite directions.

In testimony of which invention I have hereunto set my hand.

EDWARD WALDRON.

Witnesses:
R. M. HUNTER,
ERNEST HOWARD HUNTER.